(12) United States Patent
Westerinen et al.

(10) Patent No.: US 7,321,209 B2
(45) Date of Patent: Jan. 22, 2008

(54) POWER BUFFERING FOR ROTATING MEDIA STORAGE DEVICES

(75) Inventors: William J. Westerinen, Issaquah, WA (US); Stephen R. Drake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 11/088,617

(22) Filed: Mar. 23, 2005

(65) Prior Publication Data

US 2006/0214612 A1    Sep. 28, 2006

(51) Int. Cl.
*H02P 1/00* (2006.01)

(52) U.S. Cl. .................. 318/139; 318/439; 318/254; 318/138

(58) Field of Classification Search ............... 318/139, 318/138, 254, 439, 432
See application file for complete search history.

(56) References Cited

U.S. PATENT DOCUMENTS

| | | | |
|---|---|---|---|
| 5,726,550 A * | 3/1998 | Inaniwa et al. | 318/803 |
| 6,175,217 B1 * | 1/2001 | Da Ponte et al. | 322/19 |
| 2003/0067278 A1 * | 4/2003 | Nakamura et al. | 318/254 |

* cited by examiner

*Primary Examiner*—Rina Duda
(74) *Attorney, Agent, or Firm*—Workman Nydegger

(57) ABSTRACT

A method and system for buffering power for rotating media devices. A power management circuit includes a power augmentation circuit and a power storage device. The power augmentation circuit is arranged to sense when the storage device motor is accelerating and to supply additional power to the storage device motor in response thereto. The power storage device is arranged to store the additional power. The power storage device may be trickle charged from the system power supply and may also be charged as power is recaptured from the storage device motor as it decelerates.

21 Claims, 8 Drawing Sheets

POWER BUFFERING FOR ROTATING MEDIA STORAGE DEVICES

FIELD OF THE INVENTION

The invention relates generally to computers, and more particularly to supplying power to computer components.

BACKGROUND

Rotating storage devices including hard disk drives and CD and DVD drives exhibit significantly increased electrical power consumption during the process of accelerating the speed of rotation of their media spindle. This momentary peak power consumption defines the worst case power supply power capacity requirements for these components and the system. These peak power requirements increase the size and cost of the power supply. Additionally, during deceleration, kinetic energy stored in the rotating spindle and media is lost to heat in the spindle bearings.

What is needed is a method and system for augmenting the power supplied to rotating media storage devices in order to reduce the size and cost of computer power supplies. Ideally, such a method and system could also capture kinetic energy when the rotating spindle is decelerated.

SUMMARY

Briefly, the present invention provides a method and system for buffering power for rotating media devices. A power management circuit includes a power augmentation circuit and a power storage device. The power augmentation circuit is arranged to sense when the storage device motor is accelerating and to supply additional power to the storage device motor in response thereto. The power storage device is arranged to store the additional power. The power storage device may be trickle charged from the system power supply and may also be charged as power is recaptured from the storage device motor as it decelerates.

Other aspects will become apparent from the following detailed description when taken in conjunction with the drawings, in which:

DETAILED DESCRIPTION

Exemplary Operating Environment

Figure 1:
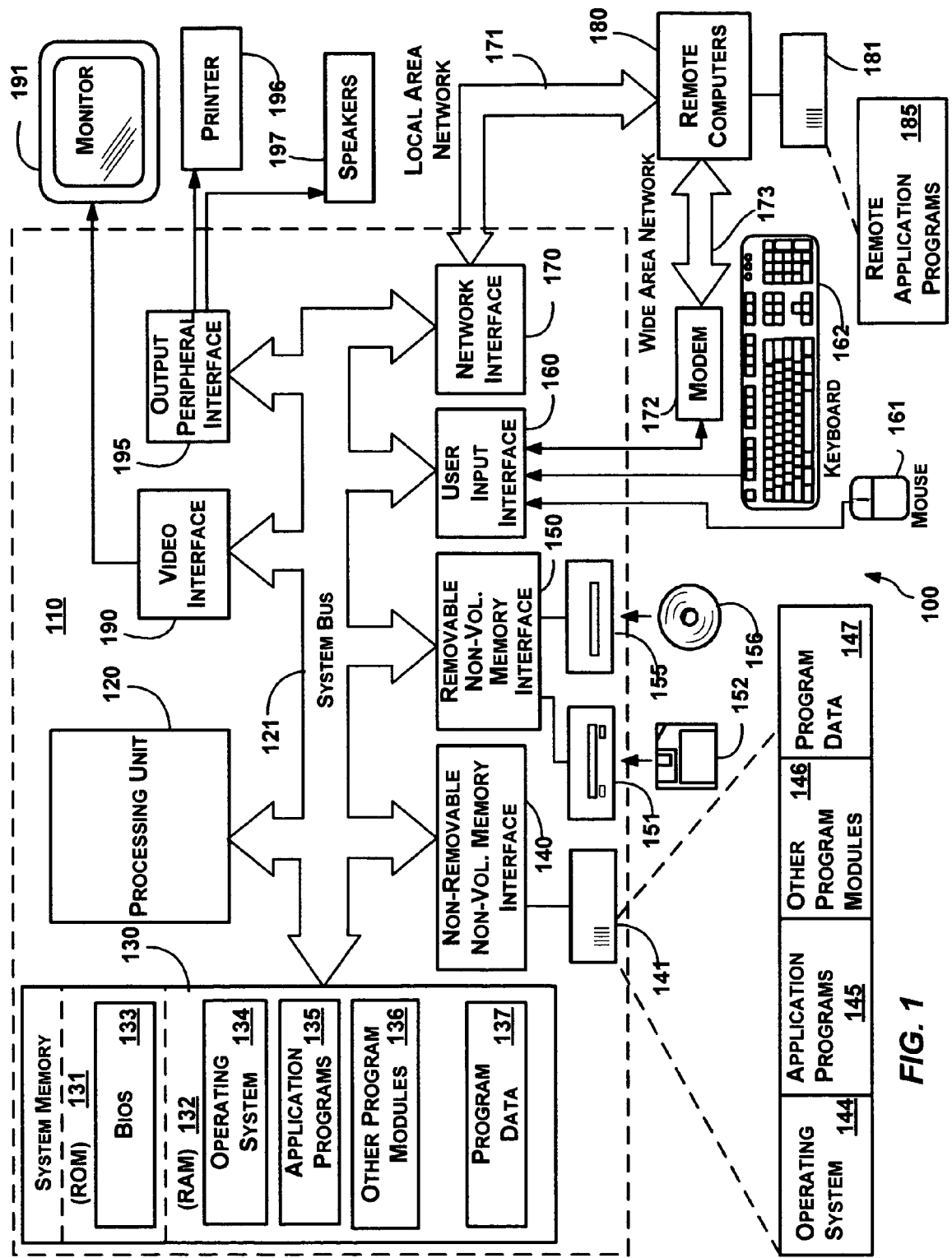
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Power Buffering

Figure 2:
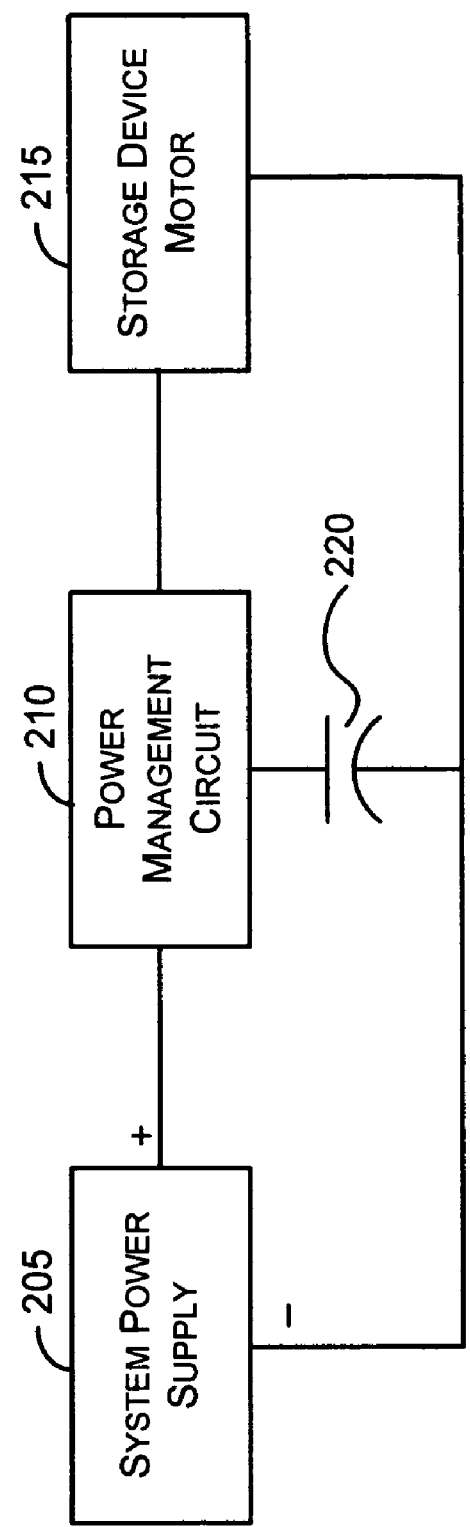
FIG. 2 is a block diagram representing an exemplary environment in which the present invention may operate in accordance with various aspects of the invention.

FIG. 2 is a block diagram representing an exemplary environment in which the present invention may operate in accordance with various aspects of the invention. The environment includes a system power supply 205, a power management circuit 210, a power storage device 220, and a storage device motor 215.

The system power supply 205 is a power supply that supplies power to components of a computer including the storage device motor 215. Typically, the power supply 205 converts alternating current (AC) to direct current (DC). It will be readily recognized that many types of power supplies may be used without departing from the spirit or scope of the invention.

The storage device motor 215 is a motor that is used to accelerate rotating media in a storage device. There may be more than one storage device motors on a computer for powering various rotating devices including hard disk drives, CD drives, DVD drives, floppy disk drives, and the like. When accelerating a rotating device, the storage device motor 215 may need considerably more power than when the rotating device is rotating at a constant velocity. When decelerating a rotating device, the rotating device may begin generating power. In some systems, this power is dissipated through friction or resistive components. In other systems, this power may be fed back to the power management circuit 210. In one embodiment, part or all of this power is captured by the power management circuit 210 and stored in the power storage device 220.

The power storage device 220 is any device that may store power for future use. Devices that may do so include capacitors, batteries, and the like. In some embodiments, one or more super or ultra capacitors are used for the power storage device 220.

The power management circuit 210 charges the power storage device 220, uses charge stored on the power storage device 220 to augment power supplied by the system power supply 205 to the storage device motor 215, and may recapture power created by decelerating the storage device motor 215. To do this, the power management circuit 210 may monitor the charge level of the power storage device 220 and the electrical energy flow to and from the storage device motor 215. When the power management circuit 210 detects steady state power flow to the storage device motor 215, the power management circuit 210 may direct a portion of the power from the system power supply 205 to the power storage device 220. When the power management circuit 210 detects power flow from the storage device motor 215, or in other words when the storage device motor 215 is acting as a generator of electrical energy as it may during spindle deceleration, the power management circuit 210 may direct this electrical energy to the power storage device 220. When the power management circuit 210 detects increased or peak power draw from the storage device motor 215, the power management circuit 210 may release electrical energy from the power storage device 220 to supplement or augment power supplied from the system power supply 205.

In one embodiment, if the storage device motor 215 attempts to accelerate before the power storage device 220 has sufficient charge, the power management circuit 210 may delay the acceleration of the power storage device 220 until the power storage device 220 has been sufficiently charged. This helps guarantee that the storage device will not draw more than a selected amount of power from the system power supply 205 at any one time. This may be useful to system designers in creating a sufficiently sized and efficient system power supply 205. It will be recognized by those skilled in the art that the more the system power supply delivers power close to its maximum output and the closer its maximum output is to the actual power requirement of the system, the more efficient the system power supply 205 may operate while being less expensive to construct for the power delivered.

It will also be readily recognized that many types of circuits may be employed as the power management circuit 210 without departing from the spirit or scope of the present invention.

Figure 3:
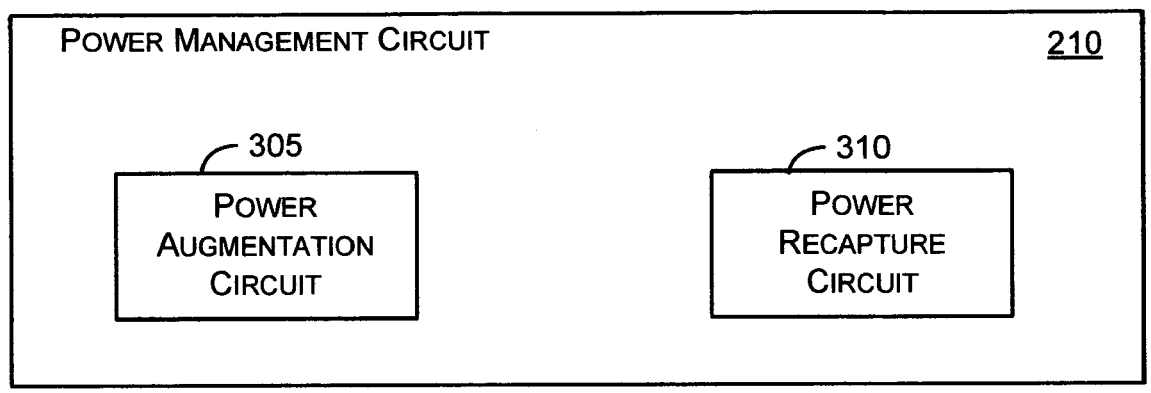
FIG. 3 is a block diagram generally representing an exemplary power management circuit in accordance with various aspects of the invention.

FIG. 3 is a block diagram generally representing an exemplary power management circuit in accordance with various aspects of the invention. The power management circuit 210 may include a power augmentation circuit 305 and a power recapture circuit 310. Some of the elements of the power augmentation circuit 305 may be used as elements in the power recapture circuit 310 and vice versa.

The power augmentation circuit 305 charges the power storage device (not shown), monitors for increased power consumption of the storage device motor 215, and releases energy from the power storage device as appropriate.

The power recapture circuit 310 monitors for power that is generated by the storage device motor 215 (e.g., during deceleration) and uses this power to charge the power storage device as appropriate.

Figure 4:
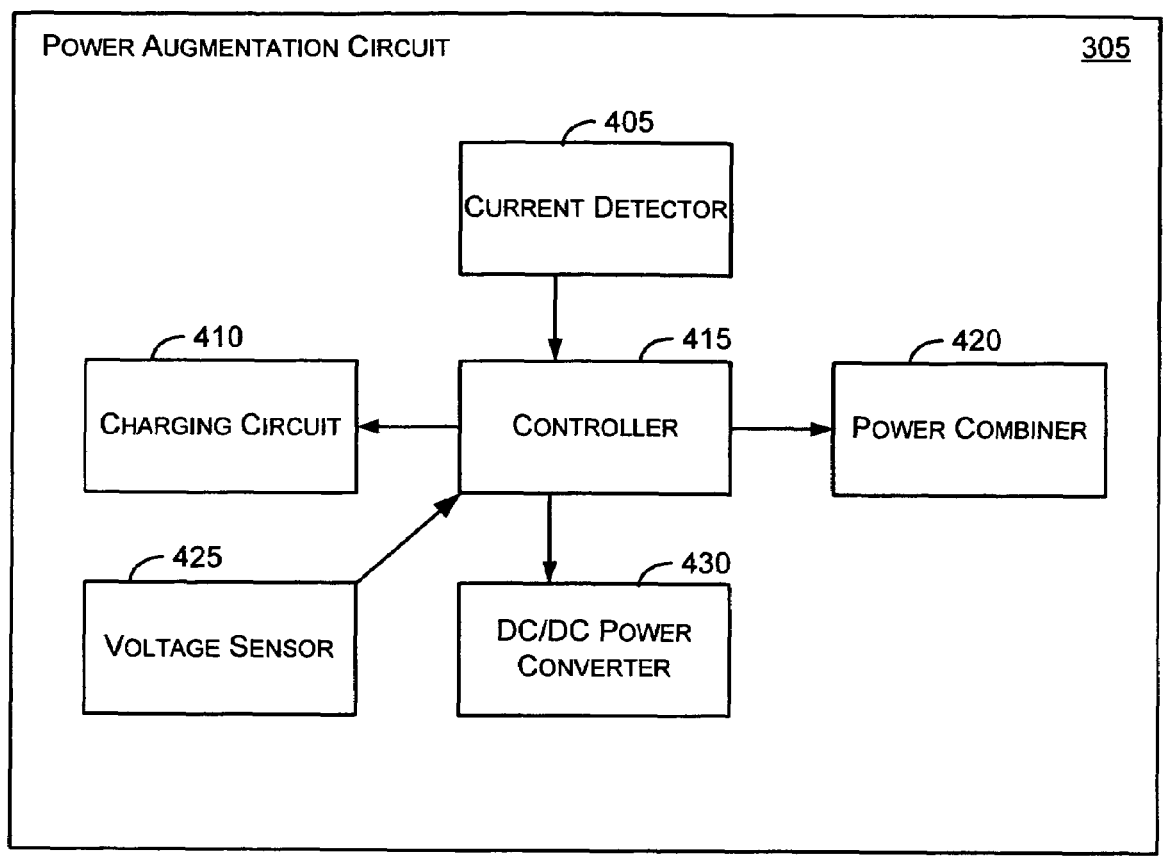
FIG. 4 is a block diagram generally representing an exemplary power augmentation circuit in accordance with various aspects of the invention.

FIG. 4 is a block diagram generally representing an exemplary power augmentation circuit in accordance with various aspects of the invention. The power augmentation circuit may comprise a current detector 405, a charging circuit 410, a controller 415, a power combiner 420, a voltage sensor 425, a DC/DC power converter 430, and other components (not shown).

The current detector 405 detects the amount of current that is being drawn from the system power supply (not shown) to supply the storage device motor (not shown). It passes this information to the controller 415.

The charging circuit 410 charges the power storage device. In one embodiment, the charging circuit 410 is a passive component such as a resistor that is coupled to the positive terminal of the system power supply. In other embodiment, the charging circuit 410 is a gate or switch coupled to the positive terminal of the system power supply that opens when instructed to do so by the controller 415.

The voltage sensor 425 senses the voltage across the power storage device. It passes this information to the controller 415. The controller may use this information to delay starting the storage device motor if, for example, there is not enough charge on the power storage device to effectively assist in accelerating the rotation of the storage device motor.

The DC/DC power converter 430 is a circuit element that steps up or down the voltage of the power storage device (not shown) to make it compatible with the voltage needed by the storage device motor. The voltage across the power storage device may not be sufficient to assist the system power supply in supplying the storage device motor. To increase the voltage presented to the storage device motor from the power storage device, the DC/DC power converter 430 may be inserted between the power storage device and the storage device motor. The DC/DC power converter 430 may increase and regulate the voltage so that current flows from the power storage device to supply the storage device motor as appropriate.

The controller 415 may instruct the DC/DC power converter 430 as to how much or to what voltage the DC/DC power converter 430 increases the voltage from the power storage device. The controller may use information from the voltage sensor 425 in instructing the DC/DC power converter 430.

The power combiner 420 combines current from the DC/DC power converter 430 and the system power supply to supply power to the storage device motor. In one embodiment, the controller 415 may instruct the power combiner 420 as to how much current from each source the power combiner 420 may use.

The controller 415 is a circuit capable of processing the various signals described above and sending instructions as described above. It will be recognized that various circuits may be used to implement the controller 415 without departing from the spirit or scope of the present invention.

Figure 5:
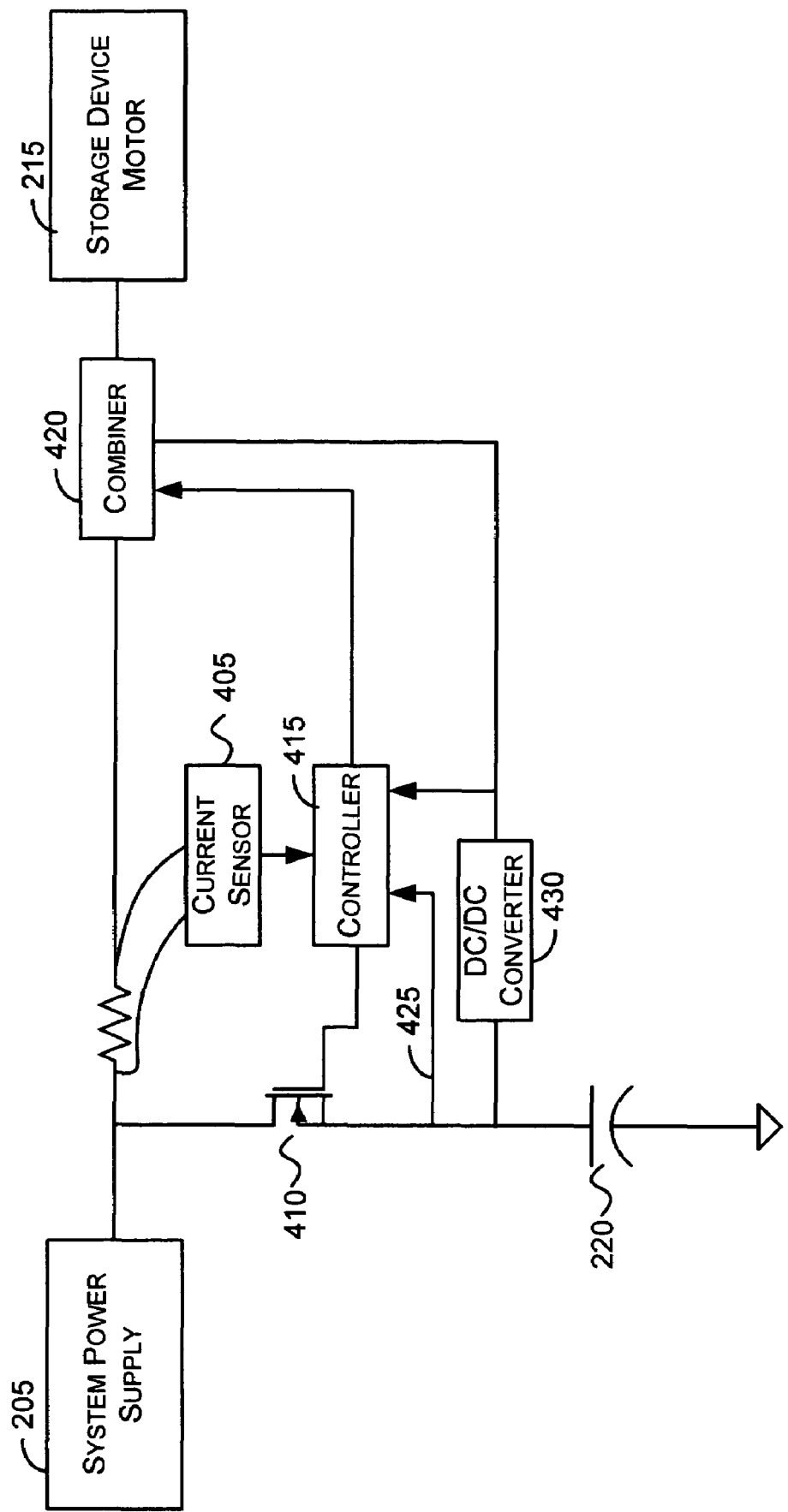
FIG. 5 is a circuit diagram having some block elements generally representing a system power supply, a storage device motor, and an exemplary power augmentation circuit in accordance with various aspects of the invention.

FIG. 5 is a circuit diagram having some block elements generally representing a system power supply, a storage device motor, and an exemplary power augmentation circuit in accordance with various aspects of the invention. The circuit includes a system power supply 205, a storage device motor 215, a power storage device 220, a current sensor 405, a charging circuit 410, a controller 415, a power combiner 420, a voltage sensor 425, and a DC/DC power converter 430.

In the embodiment shown in FIG. 5, the charging circuit 410 comprises a field effect transistor (FET) connected between the system power supply 205 and the power storage device 220, the voltage sensor 425 comprises a lead connected to a terminal of the power storage device 220, and the current sensor 405 comprises a low resistance resistor in the current path between the system power supply 205 and the storage device motor 215. Again, it will be recognized that the embodiment shown in FIG. 5 is exemplary only and that many other circuit configurations may be used to augment the power supplied to the storage device motor 215 without departing from the spirit or scope of the present invention.

Furthermore, it will be readily recognized that a similar or different circuit may be used to obtain charge from the storage device motor 215 to supply power to the power storage device 220 when the storage device motor 215 is acting as a generator (e.g., when it is decelerating). The similar or different circuit may reuse some or all of the elements shown in FIG. 5 or may comprise other elements.

Figure 6:
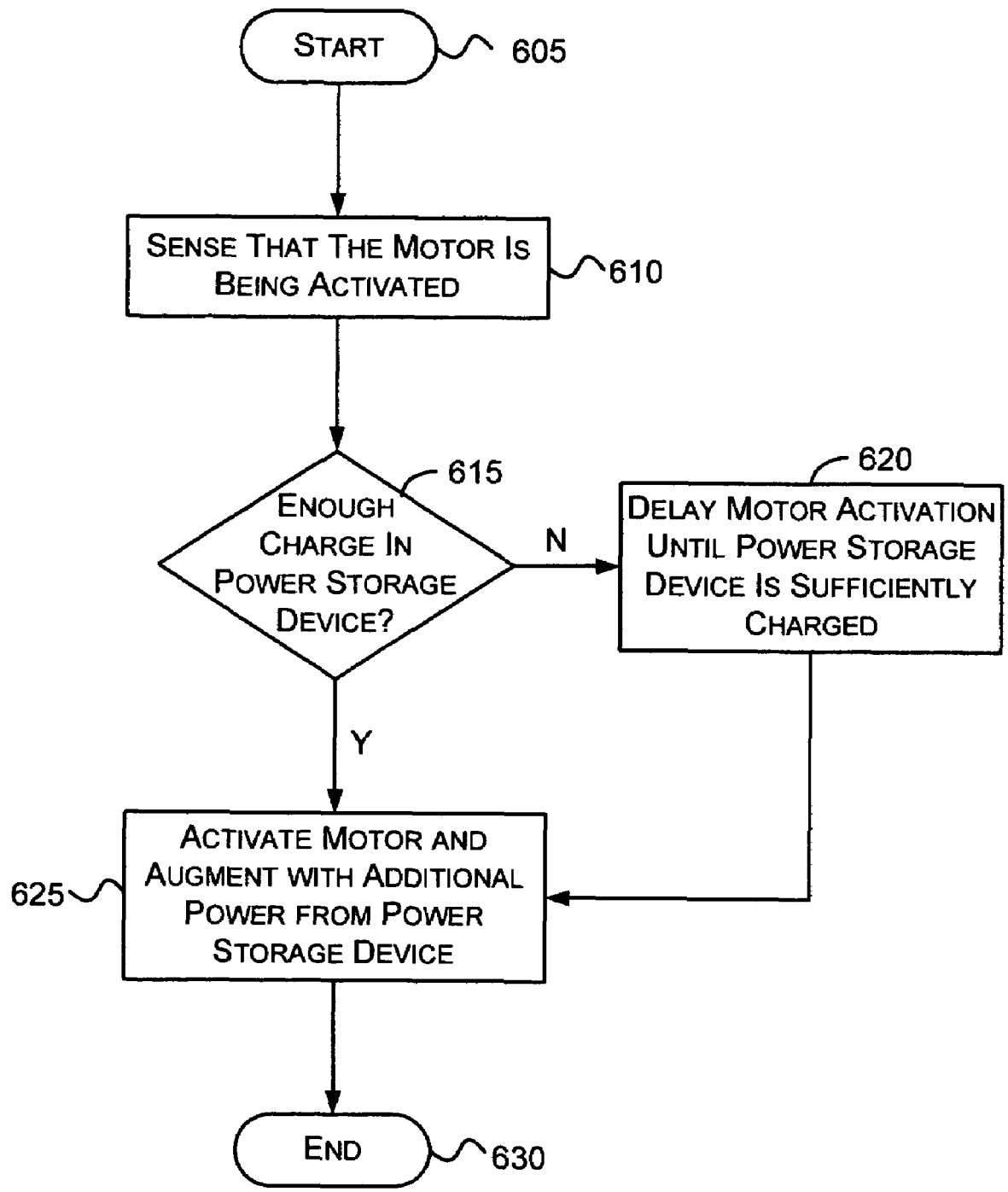
FIG. 6 is a flow diagram that generally represents exemplary actions that may occur when a motor is activated in accordance with various aspects of the invention.

FIG. 6 is a flow diagram that generally represents exemplary actions that may occur when a motor is activated in accordance with various aspects of the invention. At block 605, the actions commence.

At block 610, it is sensed that the motor is being activated. For example, control circuitry on the motor may be instructed to spin up the motor. This may be detected by a sudden increase in current sensed on a power line connected to the motor.

At block 615, a determination is made as to whether enough charge is present in the power storage device to effectively augment the power needed by the motor for spinning up. If so, processing branches to block 625; otherwise, processing branches to block 620. There may not be enough charge present in the power storage device if, for example, the computer recently came on line and the power storage device has not had enough time to charge.

At block 620, the motor activation is delayed until there is sufficient charge accumulated on the power storage device. The motor activation may be delayed by inserting a switch or gate in the power path to the motor.

At block 625, the motor is activated and augmented with additional power from the power storage device as appropriate. At block 630, the actions end. The actions may be repeated each time a motor is activated in the system.

Figure 7:
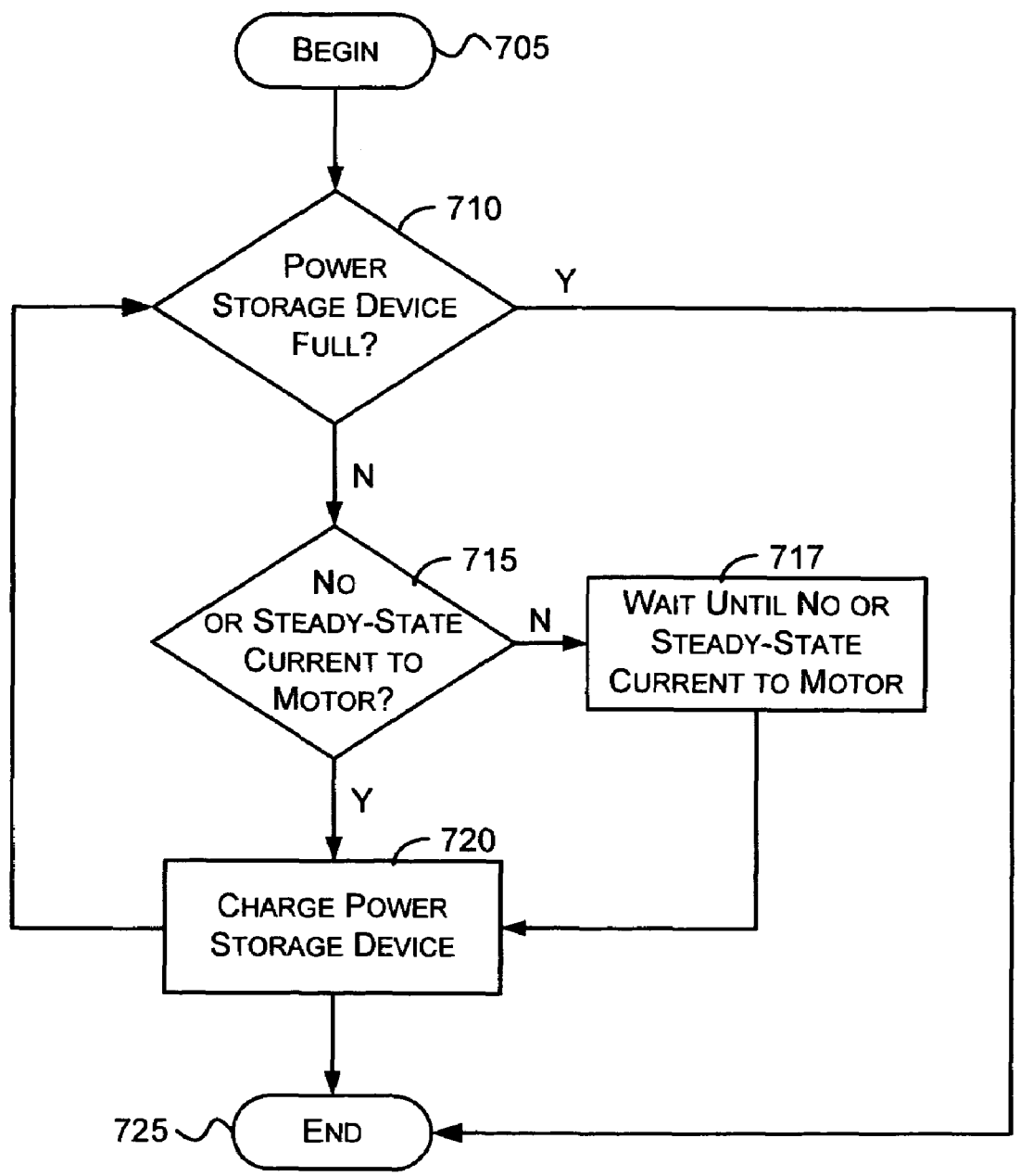
FIG. 7 is a flow diagram that generally represents exemplary actions that may occur in charging a power storage device from a system power supply in accordance with various aspects of the invention.

FIG. 7 is a flow diagram that generally represents exemplary actions that may occur in charging a power storage device from a system power supply in accordance with various aspects of the invention. At block 705, the actions commence.

At block 710, a determination is made as to whether the power storage device is already full. If so, processing branches to block 725; otherwise, processing branches to block 715. If the power storage device is already full, charging it more may result in damage to the power storage device and/or the system in which the invention operates or may simply waste electrical energy. The amount of charge in the power storage device may be detected by the voltage across the power storage device, for example.

At block 715, a determination is made as to whether either there is no current currently passing to the motor or whether the current that is passing to the motor is in a steady state. If either of these conditions are true, processing branches to block 720; otherwise, processing branches to block 717.

At block 717, the circuit waits until no current or a steady-state current is supplied to the motor. Alternatively, the circuit may not wait and may charge the power storage device as long as the power supplied to the combination of the power storage device and the motor is less than a predetermined amount.

Ideally, the power storage device is charged in a manner to guarantee that the system power supply is not required to supply more than a predetermined amount of power to the combination of the power storage device and the motor. For example, if the predetermined amount of power is 5 watts and the motor is consuming 4 watts, 1 watt may be devoted to charging the power storage device. This is useful in conserving costs in building the system power supply as the system power supply should be able to supply power to all anticipated power consumers at their anticipated levels. If a guarantee can be made that a component or a combination of components will not draw more than a predetermined amount of power at any time, then the system power supply may be designed accordingly.

At block 720, the power storage device is charged. At block 725, the actions end.

Figure 8:
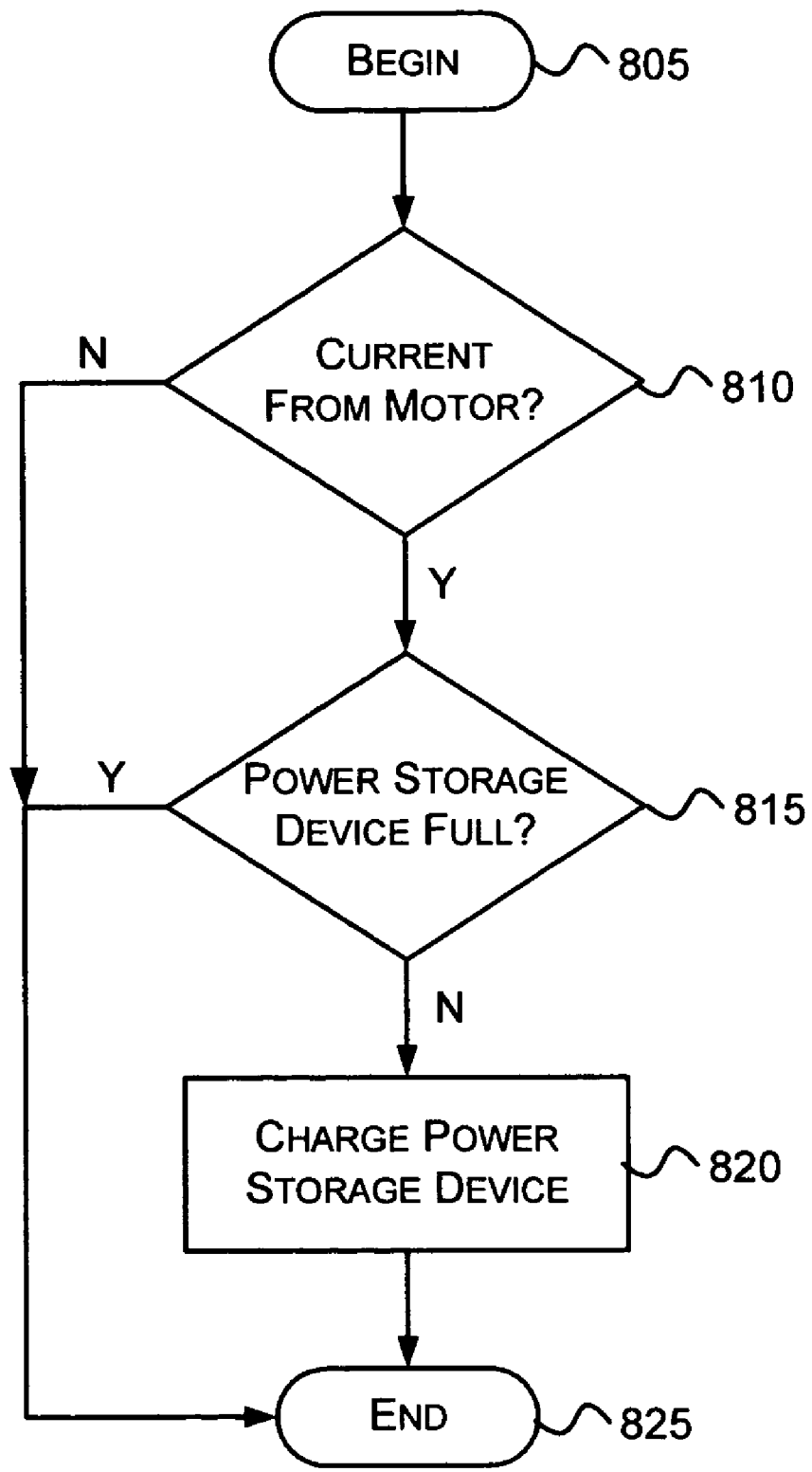
FIG. 8 is a flow diagram that generally represents exemplary actions that may occur in charging a power storage device from energy recaptured from a decelerating motor in accordance with various aspects of the invention.

FIG. 8 is a flow diagram that generally represents exemplary actions that may occur in charging a power storage device from energy recaptured from a decelerating motor in accordance with various aspects of the invention. At block 805, the actions commence.

At block 810, a determination is made as to whether the motor is generating any current. If so, processing branches to block 810; otherwise, processing branches to block 825.

At block 815, a determination is made as to whether the power storage device is full. If so, processing branches to block 825; otherwise, processing branches to block 820.

At block 820, the power generated by the motor is used to charge the power storage device. At block 825, the actions end. The actions above may be repeated periodically or continuously or may be triggered when it is current from the motor is detected.

It will be readily recognized that aspects of the invention as described above may also be used for motors other than rotating media motors and for other devices in computers that transiently draw more energy than they do at steady state.

As can be seen from the foregoing detailed description, there is provided a method and system for buffering power for rotating media storage devices. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system for buffering power associated with a storage device in a computing system, comprising:
   a system power supply arranged to supply power to the components of the computing device;
   a storage device component containing a storage device motor used to accelerate rotating media in the storage device;
   a power storage device arranged to store power for future use; and
   a power management circuit comprising a power augmentation circuit arranged to sense when the storage device motor is accelerating and to supply additional power from the power storage to the storage device motor in response thereto.

2. The system of claim 1, wherein the power augmentation circuit is arranged to sense when the storage device motor is accelerating by having a current sensor that is placed in a current path between a system power supply and the storage device motor.

3. The system of claim 1, wherein the power storage device comprises a super or ultra capacitor.

4. The system of claim 1, with the power management circuit further comprising a charging circuit arranged to charge the power storage device when no or steady-state current is supplied to the storage device motor.

5. The system of claim 4, wherein the charging circuit is further arranged to charge the power storage device at a rate that draws less power than the storage device motor when the storage device motor is accelerating.

6. The system of claim 4, wherein the power storage device has a voltage across it and further comprising a power converter that steps up or down the voltage of the power storage device to cause current to flow from the power storage device to the storage device motor.

7. The system of claim 4, with the power management circuit further comprising a combiner that combines current from the power storage device and a system power supply to supply power to the storage device motor, wherein the combiner includes an input that indicates how much current to draw from the power storage device and how much current to draw from the system power supply.

8. The system of claim 4, with the power management circuit further comprising a power recapture circuit arranged to obtain power from the storage device motor when the storage device motor is decelerating and to supply the power to the power storage device.

9. The system of claim 4, with the power management circuit further comprising a controller arranged to receive information regarding how much current is supplied to the power storage device and how much voltage is across the power storage device and further arranged to control a circuit that charges the power storage device, a power converter that steps up or down voltage from the power storage device, and a power combiner that combines power from a system power supply and the power storage device to supply power to the storage device motor.

10. The system of claim 1 further comprising a second storage device component containing a second storage device motor used to accelerate a second rotating media in the second storage device wherein the power augmentation circuit is further arranged to sense when the second storage device motor is accelerating to supply additional power from the power storage to the second storage device motor in response thereto.

11. A computer program product comprising computer-readable storage media storing computer-executable instructions that, when executed by a computing system, perform a method of buffering power for a storage device, the method comprising:

sensing when a motor of a storage device of a computer is being activated from an inactive state; and determining whether enough charge exists in a power storage device to guarantee that a system power supply need supply no more than a selected amount of power to the storage device.

12. The computer program product of claim 11, further comprising stopping the motor from being activated until sufficient charge exists in the power storage device to augment power supplied by the system power supply and guarantee that the system power supply need only supply a selected amount of power to the storage device.

13. The computer program product of claim 11, further comprising allowing the motor to be activated and augmenting the power supplied by the system power supply with additional power from the power storage device.

14. The computer program product of claim 11, further comprising charging the power storage device when doing so will not cause the system power supply to supply more than the selected amount of power to charging the power storage device.

15. The computer program product of claim 11, wherein charging the power storage device occurs when a steady-state current is supplied to the motor.

16. The computer program product of claim 11, further comprising detecting when the power storage device is full and ceasing charging the power storage device until the power storage device is not full.

17. The computer program product of claim 11, further comprising sensing when the motor is generating electricity and recapturing a least a portion of the electricity to charge the power storage device.

18. A method for powering a storage device motor, comprising:

supplying power to components of a computing device using a power supply;

charging a power storage device using the power supply when doing so does not cause the power supply to supply more than a total predetermined amount of power to the computing device components;

detecting when the storage device motor is activated from an inactive state; and supplying power from the power storage device in addition to power supplied by the power supply in response thereto.

19. The method of claim 18, wherein charging a power storage device occurs when no power is supplied to the storage device motor.

20. The method of claim 18, wherein charging a power storage device comprises recapturing power from the storage device motor as the storage device motor decelerates.

21. The method of claim 18, wherein charging a power storage device comprises drawing a small amount of current from the system power supply when the system power supply is supplying a steady-state current to the storage device motor.

* * * * *